United States Patent [19]
Rains et al.

[11] Patent Number: 4,954,199
[45] Date of Patent: Sep. 4, 1990

[54] TWO COMPONENT POLYURETHANE ADHESIVE

[75] Inventors: Randall C. Rains; Jeffrey F. Dormish, both of Pittsburgh; Susan A. Stanton, Evans City, all of Pa.; James N. Rieck, Wheeling, W. Va.

[73] Assignee: Mobay Corporation, Pittsburgh, Pa.

[21] Appl. No.: 76,951

[22] Filed: Jul. 23, 1987

Related U.S. Application Data

[63] Continuation-in-part of Ser. No. 925,002, Oct. 29, 1986, abandoned, which is a continuation-in-part of Ser. No. 868,866, May 30, 1986, abandoned.

[51] Int. Cl.$^5$ ............................................. C09J 3/14
[52] U.S. Cl. ........................... 156/331.7; 156/307.3; 428/423.1; 428/425.8; 528/85
[58] Field of Search ................... 156/331.7, 307.3; 428/423.1, 425.8; 528/85

[56] References Cited

U.S. PATENT DOCUMENTS

| | | | |
|---|---|---|---|
| 3,036,996 | 5/1962 | Kogon | 528/85 |
| 3,274,160 | 9/1966 | Ellegast et al. | 260/77.5 |
| 3,577,295 | 5/1971 | Seelbach et al. | 156/177 |
| 3,591,561 | 7/1971 | Kazama et al. | 260/77.5 |
| 3,639,354 | 2/1972 | Müller et al. | 528/85 |
| 3,686,047 | 8/1972 | Miller | 156/331.7 |
| 3,714,127 | 1/1973 | Fabris et al. | 260/77.5 |
| 3,725,355 | 4/1973 | Parrish et al. | 260/77.5 |
| 3,979,364 | 9/1976 | Rowton | 260/77.5 |
| 4,028,301 | 6/1977 | Olstowski | 260/31.4 |
| 4,045,527 | 8/1977 | Babayan et al. | 428/425.8 |
| 4,156,064 | 5/1979 | Falkenstein et al. | 528/46 |
| 4,182,898 | 1/1980 | Fujiwara et al. | 560/26 |
| 4,184,005 | 1/1980 | Bauriedel et al. | 428/420 |
| 4,193,832 | 3/1980 | Reischl et al. | 156/331 |
| 4,336,298 | 6/1982 | Schwarz | 428/285 |
| 4,444,976 | 4/1984 | Rabito | 528/60 |
| 4,487,909 | 12/1984 | Coughlin et al. | 528/60 |
| 4,530,941 | 7/1985 | Turner et al. | 521/176 |
| 4,552,934 | 11/1985 | Rabito et al. | 525/458 |
| 4,554,340 | 11/1985 | Heusch et al. | 528/77 |
| 4,568,717 | 2/1986 | Speranza et al. | 524/762 |
| 4,742,113 | 5/1988 | Gismondi et al. | 524/762 |

FOREIGN PATENT DOCUMENTS 61-26683  2/1986  Japan ................... 156/331.7

OTHER PUBLICATIONS

Bayer–Polyurethanes, Edition 1–79, pp. 47–48 and FIG. 32.

Primary Examiner—John J. Gallagher
Attorney, Agent, or Firm—Joseph C. Gil; Aron Preis

[57] ABSTRACT

The present invention is related to a structural member comprising a laminate and an adhesive where said adhesive is the reaction product of (a) 100 parts by weight of at least one hydroxy functional material having a molecular weight of at least 300 and a hydroxy functionality of at least 2 which material is preferably selected from the group consisting of polyether polyols, polyester polyols, polyester amide polyols, and polycarbonate polyols, (b) 0.2 to 20 parts by weight of an aliphatic, aromatic and/or a cycloaliphatic diamine or triamine, and (c) an organic isocyanate in an amount sufficient to render the isocyanate index between about 70 and about 150, wherein said component (c) is not prereacted with any of the components (a) and (b). In a preferred embodiment, there is included up to 50 parts by weight of component (d) which is an aliphatic polyol having a functionality of at least 2 and a molecular weight of below 300. Also in the preferred embodiment, component (c) is not prereacted with any of (a), (b) and (d).

3 Claims, No Drawings

TWO COMPONENT POLYURETHANE ADHESIVE

The present application is a continuation-in-part of pending U.S. Application Ser. No. 925,002, filed on Oct. 29, 1986, now abandoned which in turn is a continuation-in-part of Application Ser. No. 868,866, filed on May 30, 1986, now abandoned.

FIELD OF THE INVENTION

The invention is directed to adhesives and more particularly to two component structural adhesive systems.

SUMMARY OF THE INVENTION

The present invention is related to a structural member comprising a laminate and an adhesive where said adhesive is the reaction product of (a) 100 parts by weight of at least one hydroxy functional material having a molecular weight of at least 300 and a hydroxy functionality of at least 2 which material is preferably selected from the group consisting of polyether polyols, polyester polyols, polyester amide polyols, and polycarbonate polyols, (b)(0.2) to 20 parts by weight of an aliphatic, aromatic and/or a cycloaliphatic diamine or triamines, and (c) an organic isocyanate in an amount sufficient to render the isocyanate index between about 70 and about 150, wherein said component (c) is not prereacted with any of the components (a) and (b). In a preferred embodiment, there is included up to 50 parts by weight of component (d) which is an aliphatic polyol having a functionality of at least 2 and a molecular weight of below 300. Also in the preferred embodiment, component (c) is not prereacted with any of (a), (b), and (d).

The adhesive composition of the invention is particularly useful in bonding fiber-reinforced plastic materials such as SMC (sheet molding compound) which is suitable for automotive exterior body panels and for bonding of structural members and is superior to prior art adhesives in terms of its improved processability and bond integrity.

BACKGROUND OF THE INVENTION

U.S. Pat. No. 3,274,160 discloses the preparation of a hard, elastic NCO terminated polyurethane casting entailing reacting a polyisocyanate with a mixture containing a polyhydric alcohol and an organic compound having a plurality of alcoholic hydroxyl groups. In U.S. Pat. No. 3,591,561 there is disclosed the preparation of a polyurethane elastomer prepared from a lactone polyester polyol and a low molecular weight diol. The mixture of polyol and diol may then be reacted with organic diisocyanate and crosslinked with an aliphatic or an aromatic diamine or polyol such as glycerol. A polyurethane elastomer based on a polyether polyol, an extender—including glycerine—an isocyanate terminated prepolymer and an organometallic catalyst is disclosed in U.S. Pat. No. 3,725,355. A polyurethane composition from an amine initiated polyol, organic polyisocyanate and a modifier, including a glycerine initiated polyoxyalkylene compound is disclosed in U.S. Pat. No. 4,028,301. In U.S. Pat. No. 4,182,898, there are disclosed polyester polyether polyol prepolymers for use in the preparation of polyurethane. Before reacting with a diisocyanate, there are incorporated in the polyol mixture low molecular weight diols or polyols such as glycerine.

A method for making bonds which are based on polyisocyanates and compounds containing isocyanate reactive hydrogen was disclosed in U.S. Pat. No. 4,193,832. Tertiary amines are said to be suitable catalysts in the reaction. A process for the manufacture of a polyurethane adhesive is disclosed in U.S. Pat. No. 4,156,064. Accordingly, a polyaddition reaction is carried out by using excess diisocyanate in a reaction with polyols and optional chain extenders which include diamines. U.S. Pat. Nos. 3,979,364, 4,336,298, and 4,444,976 and European Pat. No. 63,534 all relate to the addition of amines in making non-sagging adhesives.

U.S. Pat. No. 4,487,909 discloses an adhesive system prepared from a polymeric polyol precursor such as a polyether polyol. A glycerine branching agent is disclosed. RIM polyurethane prepared from a high molecular weight polyol, a chain extender, a polyisocyanate and an aminated polyoxyalkylene material has been disclosed in U.S. Pat. No. 4,530,941. The preparation of the polyol is said to be in the presence of an initiator such as glycerine or an aliphatic diamine. In U.S. Pat. No. 4,554,340, there is disclosed a polyol mixture for use in the preparation of polyurethane. The polyol mixture comprises a high molecular weight polyalkylene oxide, low molecular weight diol and optionally isocyanate-reactive compounds including glycerine and diamines. In accordance with the disclosure, the polyol mixture is mixed with polyisocyanates and optionally other polyols. In U.S. Pat. No. 4,568,717, there are disclosed polymer polyols which are made by reacting a terephthalic polyester polyol with an organic polyisocyanate. The polyester polyol may be prepared by reacting polyethylene terephthalate with oxyalkylene glycol. The functionality of the polyol may be changed by including glycerine or diethanolamine.

In U.S. Pat. No. 3,714,127 there is disclosed the addition of a diamine to a two component polyurethane based adhesive for the purpose of increasing the viscosity of the adhesive to eliminate run-off or dripping. The adhesive is based on a polyisocyanate terminated prepolymer.

DETAILED DESCRIPTION OF THE INVENTION

The adhesive entailed in the laminate of the invention comprises the reaction product of:

(a) 100 parts by weight of an at least one at least 300 and having a hydroxy functionality of at least 2, said material being preferably selected from the group consisting of polyether polyols, polyesterpolyols, polyester amide polyols and polycarbonate polyols, (b) 0.2 to 20 parts by weight of at least one member selected from the group consisting of aromatic, aliphatic and cycloaliphatic diamines and triamines having a molecular weight of at least 60, preferably about 60 to 400, preferably aromatic or cycloaliphatic diamines, (c) an amount of an organic isocyanate sufficient to render the isocyanate index of the composition from 70 to 150, preferably 90 to 110, and optionally (d) 0 to 50 parts by weight of one or more aliphatic polyol having a hydroxy functionality of at least 2 and a molecular weight of less than 300, for instance glycerine or an alkoxylated glycerine having a molecular weight less than 300, provided, however, that component (c) is not prereacted with any of components (a), (b) or (d).

The presently disclosed adhesive system is superior to current, commercially significant, two component, non-sagging polyurethane and epoxy adhesives. These prior art adhesives are typically highly filled pastes which are not amenable to bulk handling operations and are difficult to pump and mix and present waste disposal problems. In addition, these prior art systems are highly sensitive to temperature and/or moisture conditions and some form of surface preparation on the SMC is required for these adhesives to form a good structural bond. In contrast, the present adhesive system exhibits low raw material viscosity, contains no abrasive fillers, forms an excellent bond to SMC without the need for special prior surface preparation, has an improved adhesion level to untreated SMC surfaces at elevated temperatures, has an excellent adhesion to SMC and to steel even after exposure to 200° C. for 1 hour, and an excellent adhesion to SMC after exposure to heat and moisture, including a 7 day immersion in water at 55° C. and at 60° C.

(a) The hydroxy functional material of the adhesive is known.

The preferred polyether polyol is generally an alkylene oxide adduct of a polyhydric alcohol having a functionality of 2 or more. The alkylene oxide may suitably be ethylene oxide, 1,2-propylene oxide or 1,2-butylene oxide or a mixture of some or all of these.

Among the preferred polyether polyols are the so-called PHD polyols which are prepared by reacting an organic diisocyanate and hydrazine in the presence of a polyether polyol. U.S. Pat. No. 3,325,421 which is incorporated herein by reference discloses a method for producing suitable PHD polyols by reacting a stoichiometric equivalent (or less) of isocyanate per equivalent diamine dissolved in a polyol having a molecular weight of at least 500 and a hydroxyl number of less than or equal to 225. Also incorporated herein by reference in this context are U.S. Pat. Nos. 4,042,537 and 4,089,835. Other suitable hydroxy functional materials, the so-called polymer polyols are prepared by polymerizing styrene and acrylonitrile in the presence of a polyether. These have been disclosed in U.S. Pat. Nos. 3,383,351, 3,304,273, 3,523,093, 3,652,639, 3,823,201 and 4,390,645 all incorporated herein by reference.

Polyester amide polyols are known in the art and include the predominantly linear condensates obtained from polyvalent saturated and unsaturated carboxylic acids or their anhydrides and polyhydric saturated and unsaturated amines, alcohols, diamines, polyamines and mixtures thereof.

Suitable polycarbonate polyols include those which may be obtained by reacting diols such as 1,3-propane diol, 1,4-butane diol and/or 1,6-hexane diol, diethylene glycol, triethylene glycol and tetraethylene glycol with diaryl carbonate (such as diphenyl carbonate) or phosgene.

The polyester polyols of the invention are well known in the art. It will however be understood that the term includes chain extended polyesters made from a glycol (e.g., ethylene and/or propylene glycol) and a saturated dicarboxylic acid (e.g. adipic acid as well as polycaprolactone diols). Other polyester polyols include poly(ethylene adipate) glycol, poly(propylene adipate) glycol, poly(butylene adipate) glycol, poly(neopentyl sebacate) glycol, etc. Also, suitable polyester polyols include those obtainable by reacting such polyols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1,3-propanediol, 2-ethyl-1,3-hexanediol, 1,5-pentanediol, thiodiglycol, 1,3-propane-diol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, mannitol, sorbitol, methyl-glycoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid and chlorendic acid; the acid anhydrides and acid halides of these acids may also be used.

(b) Suitable diamines and triamines having a molecular weight of at least 60 include aliphatic, aromatic and cycloaliphatic diamines and triamines, preferably aromatic or cycloaliphatic diamines. Particularly preferred are isophorone diamine, methylene bis(cyclohexyl amine) and diethyl toluene diamine. Other preferred amines include diethylene triamine, 1-methyl-3,5-diethyl-2,4-diaminobenzene and/or its mixture with up to 35 percent by weight, based on the mixture of 1-methyl-3,5-diethyl-Z,6-diaminobenzene.

(c) Substantially any organic isocyanate may be useful in the practice of the invention. Aromatic, aliphatic, cycloaliphatic, arylaliphatic and heterocyclic polyisocyanate may be used. Examples of suitable polyisocyanates are described by W. Siefken in Justus Liebigs Annalen der Chemie, 562, pages 75 to 136. Among the polyisocyanates described therein are those corresponding to the general formula $$Q(NCO)_n$$

wherein n represents 2-4 preferably 2 and Q represents an aliphatic hydrocarbon radical containing from 2 to 18, preferably 6-10 carbon atoms. Typical aromatic polyisocyanates include m-phenylene diisocyanate, o-phenylene diisocyanate, polymethylene polyphenylisocyanate, 2,4-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanate-phenyl)methane and 4,4'-diphenylpropane diisocyanate and mixtures thereof. Preferred are 2,4- and 2,6-toluene diisocyanates and methylene-bridged polyphenyl polyisocyanate mixtures having a functionality of from about 2 to about 4. Most preferred methylene-bridged polyphenyl polyisocyanate mixtures contain 20 to about 100 percent by weight of methylene diphenyl diisocyanate isomers with the balance being polymethylene polyphenyl polyisocyanate having higher molecular weights. Especially preferred are toluene diisocyanates, diphenylmethane diisocyanate, isophorone diisocyanate and methylene-bis-cyclohexylisocyanate.

(d) The optional component, used in an amount of up to 50 parts by weight, preferably up to 20 parts by weight, per 100 parts of component (a) consists of one or more aliphatic polyols having a functionality of at least 2, preferably 2 or 3 and having a molecular weight of below 300. These include ethyleneglycol, propylene glycol, 1,3-dihydroxypropane, 1,4-dihydroxybutane, 1,6-dihydroxyhexane, glycerine, trimethylol propane and low molecular weight ethoxylation and/or propoxylation products of such polyols.

In the practice of the invention component (c)—the organic isocyanate is mixed with the second component—a mixture of (a), (b) and optionally (d)—in a predetermined ratio designed to produce an isocyanate index of from 70 to 150.

In the preferred method for the preparation and application of the adhesive of the invention, at least one polyhydroxy polyether having a viscosity, at 23° C., of at most 2000 mPa.s, preferably at most 1000 mPa.s is used as component (a). Component (b) and optionally (d) are dissolved in component (a) so that the resulting viscosity, at 23° C., is at most 2000, preferably at most 1000 mPa.s. Component TM (c) the organic isocyanate having at 23° C. a viscosity of at most 1000, preferably at most 500 mPa.s, is mixed in the resulting solution of TM (a), (b) and optional (d) (with the aid of a countercurrent mixing device forming beads of a non-sagging reaction mixture, applying the beads on at least one surface to be bonded and bringing the surface to be bonded into contact one with the other, optionally under pressure and/or heat, until the reaction mixture is converted to the fully reacted reaction products acting as adhesives.) In the preferred method component (b) is used in an amount of from 0.2 to 20 parts by weight per 100 parts of component (a). The isocyanate index is within the limits of from 70 to about 150. (Any suitable countercurrent mixing device may be used; preferably however, the outlet tube of the device should have an inner diameter of about 2 to 6 mm.)

The adhesive systems of the invention may optionally include catalysts. These include the (conventional polyurethane catalyst) preferably tin catalysts and tertiary amine catalysts.

Suitable organic tin compounds include tin-(II) salts of carboxylic acids such as tin acetate, tin octoate, tin 2-ethylhexanoate and tin laurate, and the tin-(IV)-compounds such as dibutyl tin oxide, dibutyl tin dichloride, dibutyl tin diacetate, dibutyl tin dilaurate, and dibutyl tin maleate or dibutyl tin diacetate.

Preferred tin catalysts include sulphur-containing tin compounds such as di-(octyl)-tin-(IV)-bis-thiomethyl or dimethyl tin-(IV)-bis-thiolauryl: dimethyl-tin-bis-thioglycolic acid hexyl ester; or dibutyl tin-bis-thioglycolic acid octyl ester. The above-mentioned catalysts can obviously be used as mixtures. Combinations of organic metal compounds with amino pyridines, hydrazino pyridines (German Auslegeschriften No. 2,434,185, 2,601,082 and 2,603,834) or 1,4-diazabicyclo-2,2,2-octane and/or conventional tertiary amine catalysts of the type usually used in polyurethane chemistry can also be used if desired. The catalysts when used are generally used in a quantity of 0.001 to 5% by weight, preferably 0.01 to 2% by weight based on the weight of all the components. The use of a catalyst brings about a shortening of the handling time of the adhesive system.

The invention is further illustrated, but is not intended to be limited by the following examples in which all parts and percentages are by weight unless otherwise specified.

EXAMPLES 1–10

In the working examples described below use was made of the following components: the hydroxy functional material in composition 1 was a mixture (25/75 by weight) of a branched hydroxyl polyether obtained by propoxylation of trimethylol propane (molecular weight of about 450) and a linear polypropylene glycol having a molecular weight of 2000 (hereinafter hydroxyl polyether-1). The hydroxy functional material in compositions 6 and 7 consists of the same components except that their weight ratio is 75/25. The hydroxy functional material in compositions 2 and 3 was a mixture consisting of: 75 parts of "Polyol A" which is a dispersion having an OH number of about 28, a solid content of 20 percent by weight, and a viscosity at 25° C. of about 3200 mPa.s of a polyhydrazodicarbonamide in a glycerine initiated propylene oxide/ethylene oxide polyether with an OH number of 35 and produced by reacting toluene diisocyanate and hydrazine hydrate in the presence of the polyether according to U.S. Pat. No. 4,042,537; 100 parts of "Polyol B" which is a glycerin initiated, propylene oxide/ethylene oxide polyether polyol having an OH number of 35, a viscosity of about 880 mPa.s and a number average molecular weight of about 4800: and 20 pbw of a glycerin initiated propylene oxide polyether polyol having an OH number of 470 and a functionality of about 3 and a number average molecular weight of about 350. The hydroxy functional material in Examples 4 and 5 was a dispersion similar to "Polyol A" above except that its OH number was 201 and that it contained 40% solids. In compositions 8 and 9, the hydroxy functional material was a 50/50 mixture of a "Polyol B" and hydroxyl polyether-1. Example 10 made use of a mixture consisting of 20 pbw of hydroxyl polyether-1, 75 pbw of "Polyol A" and 100 pbw of "Polyol B". The indicated drying agent was finely ground zeolite (50% in castor oil). In all the experiments, the isocyanate was a commercially available MDI, Mondur CD or Mondur MR, both from Mobay Corporation. Mondur CD is a liquid carbodiimide-modified 4,4'-diphenylmethane diisocyanate having an NCO content of about 30% and a viscosity at 23° C. of less than 100 mPa.s.

Mondur MR is polymethylene polyphenyl isocyanate having an NCO content of 31.5 percent and an amine equivalent of 133.

All the adhesives in the examples which follow were mixed for 3 minutes and applied by hand to SMC and cured for 10 minutes @120° C. in a forced air oven. The bond thickness was about 0.030 inch (0.0762 cm) and the bond area was about 1 in$^2$ (6.45 cm$^2$). Composition number 5 required the cure to be at 140° C. for 10 minutes.

Additional laminates of polyurethane (RIM) elastomer, polyamide, polycarbonate and polyester were successfully bonded using the adhesive of the invention.

TABLE 1

|  | 1 | 2 | 3 | 4 | 5 | 6 | 7 | 8 | 9 | 10 |
|---|---|---|---|---|---|---|---|---|---|---|
| Hydroxyfunctional material[1] | 100 | 195 | 195 | 100 | 100 | 100 | 100 | 100 | 100 | 195 |
| 1,4 butanediol | 10 | 12 | 12 | — | — | — | — | — | — | 12 |
| Diamine | 10[6] | 16[6] | 16[6] | 4[7] | 4[7] | 6[6] | 6[6] | 5[8] | 5[8] | 16[6] |
| Drying agent | — | 6 | 6 | 5 | 5 | 5 | 5 | 5 | 5 | 6 |
| Isocyanate[2] | 78.2 | 43.5[5] | 46.1[3] | 56.8[5] | 60.6[3] | 75.2[5] | 79.4[3] | 50.5[5] | 53.5[3] | 41.0[5] |
| Properties |  |  |  |  |  |  |  |  |  |  |
| Pot life (minutes) | 9 | 10 | 10 | 180 | 240 | 40 | 40 | — | — | — |
| Lap shear @ r.t., Mpa | 3.3 | 2.9 | 5.3 | 5.0 | 3.1 | 4.2 | 4.0 | 4.5 | 5.2 | 2.6 |
| % FT[4] | 100 | 50 | 100 | 100 | 100 | 44 | 100 | 100 | 100 | 22 |

TABLE 1-continued

|  | 1 | 2 | 3 | 4 | 5 | 6 | 7 | 8 | 9 | 10 |
|---|---|---|---|---|---|---|---|---|---|---|
| After exposure 1 hr. @ 200° C. | 2.4 | 2.4 | 1.9 | 2.9 | 3.5 | 3.1 | 3.2 | 3.2 | 3.5 | 1.9 |
| % FT | 100 | 82 | 100 | 90 | 100 | 24 | 43 | 93 | 100 | 42 |
| After 7 days water immersion @ 60° C. | 2.2 | 1.5 | 2.1 | 2.8 | 2.5 | 2.9 | 3.0 | 2.3 | 2.3 | 1.4 |
| % FT | 100 | 5 | 40 | 87 | 100 | 60 | 88 | 83 | 90 | 27 |
| +24 hrs. at r.t. | — | 2.1 | 3.1 | 2.7 | 2.5 | 2.6 | 2.9 | 2.1 | 2.4 | 1.5 |
| % FT | — | 32 | 100 | 38 | 83 | 8 | 73 | 83 | 100 | 33 |

[1] See text for details.
[2] The amount of isocyanate is given in grams per 100 grams of the hydroxy functional material, 1,4 butane diol and diamine.
[3] Mondur CD polyisocyanate from Mobay Corporation.
[4] Degree of fiber tear by inspection.
[5] Mondur MR polyisocyanate from Mobay Corporation.
[6] Isophorone diamine.
[7] Diethyl toluene diamine.
[8] Methylene bis(cyclohexylamine).

EXAMPLES 11–14

Examples 11–14 are demonstrative of the composition of the invention wherein included is the optional glycerine. These compositions appears to be more resistant to hydrolysis.

TABLE 2

|  | 11 | 12 | 13 | 14 |
|---|---|---|---|---|
| Hydroxy functional[1] material | 100 | 100 | 100 | 100 |
| Glycerine | 10 | 10 | 10 | 10 |
| Diamine | 6[2] | 6[2] | 6[3] | 6[3] |
| Drying Agent | 5 | 5 | 5 | 5 |
| Isocyanate[4] | 111[5] | 105[6] | 110[5] | 104[6] |
| Properties: | | | | |
| Pot life (min.) | 23 | 35 | 23 | 35 |
| Lap shear at r.t. MPa | 4.1 | 4.1 | 3.3 | 3.2 |
| % FT | 68 | 97 | 72 | 100 |
| at r.t. after 1 hr. at 200° C. | 3.2 | 3.4 | 2.5 | 2.6 |
| % FT | 32 | 42 | 73 | 72 |
| at r.t. after 7 days at 60° C. water | 3.0 | 2.9 | 2.7 | 2.6 |
| % FT | 100 | 98 | 100 | 52 |
| +24 hrs. at r.t. | 2.7 | 2.6 | 2.6 | 2.3 |
| % FT | 100 | 85 | 97 | 70 |

[1] The same components and ratio as in Example 6.
[2] Isophorone diamine.
[3] Methylene bis(cyclohexyl amine).
[4] The amount indicated is in grams per 100 grams of the mixture consisting of hydroxy functional materials, glycerine and diamine.
[5] Mondur CD.
[6] Mondur MR.

EXAMPLES 15–25

In the series of Examples 15–23, the hydroxy functional material was a mixture of 75 pbw Polyol A, (see above) and 100 pbw of Polyol B. In Compositions 24 and 25, instead of Polyol A, the mixture contained 100 pbw of Niax polymer 34–28 which is a commercial product of Union Carbide and is a polyether polyol characterized as follows: viscosity (at 25° C.) 1958 cps: apparent specific gravity 1.043: hydroxyl number 28.0: % polyacrylonitrile 10.9: molecular weight base polyol 5000; functionality (base polyol) 3.

TABLE 3

|  | 15 | 16 | 17 | 18 | 19 | 20 | 21 | 22 | 23 | 24 | 25 |
|---|---|---|---|---|---|---|---|---|---|---|---|
| Hydroxy functional material[1] | 175 | 175 | 175 | 175 | 175 | 175 | 175 | 175 | 175 | 175 | 175 |
| Glycerine | 20[2] | 20[3] | 20 | 20 | 20 | 20 | 20 | 20 | 20 | 20 | 20 |
| Diol[4] | 12 | 12 | 12[5] | 12[6] | 12[7] | 12 | 12 | 12 | 12 | 12 | 12 |
| Diamine[8] | 16 | 16 | 16 | 16 | 16 | 16[9] | 16[10] | 16 | 16 | 16 | 16 |
| Drying agent | 6 | 6 | 6 | 6 | 6 | 6 | 6 | 6 | 6 | 6 | 6 |
| Isocyanate[11], gm/100 gm blend[13] | 46.3 | 59.5 | 62.1 | 65.3 | 67.6 | 73 | 70.9 | 71.9 | 76.3[12] | 71.9 | 76.3[12] |
| Properties: | | | | | | | | | | | |
| Lap shear, MPa @ r.t. | 3.0 | 3.1 | 3.8 | 3.5 | 2.8 | 3.4 | 4.0 | 4.2 | 3.7 | 4.3 | 4.8 |
| % FT | 80 | 60 | 100 | 74 | 98 | 93 | 100 | 93 | 98 | 77 | 100 |
| After 1 hr. @ 200° C. | 2.5 | 2.2 | 2.7 | 2.0 | 1.9 | 2.7 | 1.9 | 2.0 | 0 | 2.6 | 0 |
| % FT | 93 | 53 | 82 | 52 | 23 | 97 | 52 | 92 | 0 | 75 | 0 |
| After 7 days @ 60° C. water | 1.8 | 1.7 | 2.4 | 2.3 | 2.3 | 1.9 | 2.3 | 2.5 | 2.0 | 2.6 | 2.7 |
| % FT | 74 | 48 | 92 | 85 | 93 | 72 | 100 | 90 | 100 | 72 | 92 |
| +24 h. r.t. | 1.8 | 1.9 | 2.5 | 2.0 | 2.2 | 2.0 | 2.2 | 2.6 | 2.4 | 2.8 | 2.7 |
| % FT | 90 | 92 | 100 | 68 | 93 | 77 | 100 | 100 | 100 | 100 | 77 |

[1] See Text.
[2] Glycerine plus propylene oxide, equivalent weight about 90.
[3] Trimethylol propane.
[4] 1,4 butane diol, except where indicated.
[5] 1,6 hexane diol.
[6] 1,2-propylene glycol.
[7] Ethylene glycol.
[8] Isophorone diamine, except where indicated.
[9] Diethyl toluene diamine.
[8] Isophorone diamine, except where indicated.
[9] Diethyl toluene diamine.
[10] Methylene bis(cyclohexylamine).
[11] Mondur MR except where noted.
[12] Mondur CD.
[13] The blend consisting of the hydroxy funtional material, glycerine, diol and diamine.

EXAMPLE 26

25 parts by weight of propoxylated trimethylol propane having a molecular weight of 450 and a viscosity at 23° C. of 650 mPa.s, 75 parts by weight of polypropylene glycol having a molecular weight of 1,000 and a viscosity at 23° C. of 150 mPa.s, 10 parts by weight of 1,4-butanediol and 15 parts by weight of isophorone diamine are admixed to form component (a) having a viscosity at 23° C. of 350 mPa.s.

Component (b) consists of a liquid carbodiimide-modified 4,4'-diisocyanatodiphenyl methane having an NCO-content of about 30% by weight and a viscosity at 23° C. of 60 mPa.s.

Components (a) and (b) are admixed at room temperature using a countercurrent mixing device, the weight ratio (a):((b) being 1.23:1 which corresponds to an NCO-index of 100.

The reaction mixture leaving the mixing device consists of non-sagging beads having a diameter of 2.5 mm. The non-sagging properties of the beads are evident from the fact that the beads do not change their shape when applied to a vertical surface.

The reaction mixture is applied to SMC to be bonded to a second SMC-substrate, the overlap length being 10 mm and the bond thickness being 0.8 mm. After curing the bonds at 140° C. for 40 minutes the shear strength is found to be 10 N/mm².

COMPARATIVE EXAMPLES

The adhesive system of the invention was compared to prior art systems in terms of their properties and effectiveness. The table below summarizes the results of the comparison. In the table the notation P6600 denotes Pliogrip 6600 extended with Pliogrip 6630: T 7500 denotes Tyrite 7500A extended with Tyrite 7510D: F-310 denotes Fusor 310A extended with Fusor 310C, P6600, T-7500 and F-310 all contained 20-30% filler. In preparing the test specimen, the bonding condition in respect to the competitive materials were as follows: hand mix, $CH_2Cl_2$ wash, cured at 140° for 30 minutes, bond thickness of 0.8 mm, bond area about 0.3 in². The corresponding conditions for the system of the invention were: machine mix: the steel—where applicable—was washed with $CH_2Cl_2$, no pre-treatment of the SMC, cure conditions, bond thickness and area were identical to the ones above. In evaluating the failure mode of the test specimens a quantitative differentiation between a failure due to loss of adhesion, cohesive failure and failure in the substrate was based on testing five specimens of each of the systems. A failure of all five specimens by loss of adhesion was noted as "1" while a failure of 4 specimens by loss of adhesion and 1 specimen by substrate failure was noted as "2". 3 failures by loss of adhesion and 2 by substrate failure rated the system as "3" while "4" denotes a system where two specimens failed due to loss of adhesion and three failed in the substrate. A rating of "5" was ascribed to a system wherein one specimen failed due to loss of adhesion and 4 specimens failed due to substrate failures where all five specimens failed due to substrate failure the rating was "6".

As is clearly indicated the present system compares favorably with prior art adhesives and is considerably better than most in many respects.

TABLE 4

| System | Viscosity OH/NCO | −40° C. | Lap Shear (MPa)[1] | | | | Peel (pli)[2] | | Side Impact (in-lb/in²)[3] | |
| --- | --- | --- | --- | --- | --- | --- | --- | --- | --- | --- |
| | | | RT | +160° C. | 1 h. @ 200° C. | 7 days 60° C./H2O | RT | 1 h. @ 20° C. | RT | 1 hr. @ 200° C. |
| Pliogrip 6600/6630 | 15,000/ 40,000 | 9.8(6)/ 16.0(1) | 6.7(C)/ 7.9(1C) | 0.7(1)/ 0.3(1) | 2.3(C)/ 3.3(C) | 0.6(C)/ 4.2(1) | 121(3C)/ 105(1) | 49(1)/ 50(1) | 61.7(C) | |
| Tyrite F500A/ F510D | Thixotropic Paste | 3.9(6)/ 18.5(1) | 7.6(6)/ 11.0(1C) | 0.4(1)/ 0.2(1) | 7.2(C)/ 13.9(1) | 0.8(C)/ 6.1(1) | 121(3)/ 100(3) | 62(3)/ 105(3) | 138.2(C) | |
| Fusor 310 A/C | Thixotropic Paste | 9.4(6)/ 14.2(1) | 9.9(6)/ 17.1(1C) | 0.6(1)/ 0.3(1) | 9.2(6)/ 19.2(1) | 0.7(C)/ | 106(3)/ 113(6) | 112(3)/ 115(6) | 21.6(1) | |
| Present Invention | 2,000/ 200 | 10.0(6)/ 13.7(1) | 10.5(6)/ 8.0(1) | 0.8(3)/ 0.5(1) | 6.6(4)/ 14.9(1) | 8.0(5)/ 4.9(1) | 126(3)/ 111(4) | 143(5)/ 121(5) | 37.5(5)/ 38.0(1) | 30.0(4)/ 43.0(1) |

[1]MPa (Mega Pascal) = 1 N/mm²
[2]pli = 0.179 kg/linear centimeter
[3]1 in.lb/in² = 0.0175 Joule/cm²

Notes:
The values in parenthesis indicate the failure mode as is explained in the text above. "C" indicates cohesive failure in the adhesive layer. In each field the upper half represents SMC bonded to SMC and the lower half represents steel to steel. In the steel to steel peel values, a notation 6 indicates a tendency for the metal to bend without losing adhesion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for bonding laminae comprising applying to at least one surface to be bonded an adhesive comprising the reaction product of (a) 100 parts by weight of at least one hydroxy functional material having a molecular weight of at least 300 and a functionality of at least 2; (b) about 0.2 to about 20 parts by weight of at least one member selected from the group consisting of isophorone diamine, methylene bis(cyclohexyl amine), diethyl-toluene diamine, diethylene triamine and 1-methyl-3,5-diethyl-2,4-diaminobenzene said member having a molecular weight of at least 60 ; and (c) an organic isocyanate in a sufficient amount to render the isocyanate index of the adhesive about 70 to about 150; said reaction product being further characterized in that said (c) is not prereacted with any of said (a) and (b).

2. The method for bonding substrate comprising applying to the surface of at least one substrate the reaction product of
   (a) 100 parts by weight of at least one polyhydroxy polyether having a viscosity, at 23° C. of at most 2000 mPa.s;
   (b) 0.2 to 20 parts by weight of at least one member selected from the group consisting of isophorone diamine, methylene bis(cyclohexyl-amine), diethyl-toluene diamine, diethylene triamine and 1-methyl- 3,5-diethyl-2,4-diaminobenzene said member having a molecular weight of at from 60 to 400;

(c) an organic isocyanate having a viscosity at 23° C. of at most 1000 mPa.s wherein said (c) is admixed in a solution of said (b) in said (a) using a countercurrent mixing device and wherein said reaction product is in the form of beads, and bringing the surfaces to be bonded into contact one with the other.

3. A structural member comprising a lamina and an adhesive wherein said adhesive comprises the reaction product of (a) 100 parts by weight of at least one hydroxy functional material having a molecular weight of at least 300 and a functionality of at least 2;

(b) about 0.2 to about 20 parts by weight of at least one member selected from the group consisting of isophorone diamine, methylene bis(cyclohexylamine), diethyl-toluene diamine, diethylene triamine and 1-methyl-3,5-diethyl-2,4-diaminobenzene said member having a molecular weight of at least 60; and (c) an organic isocyanate in a sufficient amount to render the isocyanate index of the adhesive about 70 to about 150 said reaction product being further characterized in that said (c) is not prereacted with any of said (a) and (b).

* * * * *